US012807172B2

(12) United States Patent
Bennie et al.

(10) Patent No.: US 12,807,172 B2
(45) Date of Patent: Nov. 24, 2026

(54) SYSTEMS AND METHODS FOR PERFORMING MITIGATION ACTIONS IN A TRAFFIC LIGHT OUTAGE EVENT

(71) Applicant: Ford Global Technologies, LLC, Dearborn, MI (US)

(72) Inventors: Clara Bennie, Sterling Heights, MI (US); Mahmoud Yousef Ghannam, Canton, MI (US)

( * ) Notice: Subject to any disclaimer, the term of this patent is extended or adjusted under 35 U.S.C. 154(b) by 83 days.

(21) Appl. No.: 18/811,456

(22) Filed: Aug. 21, 2024

(65) Prior Publication Data

US 2026/0054743 A1 Feb. 26, 2026

(51) Int. Cl.
*B60Q 1/00* (2006.01)
*B60W 30/14* (2006.01)
(Continued)

(52) U.S. Cl.
CPC .......... *B60W 50/14* (2013.01); *B60W 30/146* (2013.01); *B60W 30/18154* (2013.01); *B60W 50/0097* (2013.01); *B60W 60/001* (2020.02); *H04W 4/40* (2018.02); *B60W 2050/146* (2013.01); *B60W 2420/408* (2024.01); *B60W 2554/406* (2020.02); *B60W 2555/60* (2020.02); *B60W 2556/10* (2020.02); *B60W 2556/40* (2020.02); *B60W 2556/50* (2020.02); *B60W 2556/65* (2020.02)

(58) Field of Classification Search
CPC ............... B60W 50/14; B60W 30/146; B60W 30/18154; B60W 50/0097; B60W 60/001; B60W 2050/146; B60W 2420/408; B60W 2554/406; B60W 2555/60; B60W 2556/10; B60W 2556/40; B60W 2556/50; B60W 2556/65; H04W 4/40; G08G 1/0141; G08G 1/0129; G08G 1/04; G08G 1/096783; G08G 1/097
USPC ...................... 340/425.5, 905, 907, 471, 476
See application file for complete search history.

(56) References Cited

U.S. PATENT DOCUMENTS

2020/0284608 A1* 9/2020 Ghannam .......... G01C 21/3697
2020/0319636 A1 10/2020 Urano et al.
(Continued)

OTHER PUBLICATIONS

Morten Bornø Jensen, et al., Vision for Looking at Traffic Lights: Issues, Survey, and Perspectives, IEEE, http://ieeexplore.ieee.org. 10.1109/TITS.2015.2509509, Feb. 3, 2016, pp. 1800-1815.

*Primary Examiner* — Anh V La
(74) *Attorney, Agent, or Firm* — Frank Lollo; Eversheds Sutherland (US) LLP

(57) ABSTRACT

A vehicle including a sensor unit and a processor is disclosed. The sensor unit may be configured to capture inputs associated with vehicle surroundings. The processor may predict that the vehicle may be approaching an intersection point on a road, and determine that the intersection point may include a traffic light based on the inputs obtained from the sensor unit responsive to predicting that the vehicle may be approaching the intersection point. The processor may further determine that the traffic light may be in a suboptimal condition based on the inputs obtained from the sensor unit, responsive to determining that the intersection point includes the traffic light. The processor may further output a notification responsive to determining that the traffic light may be in a suboptimal condition.

20 Claims, 4 Drawing Sheets

(51) Int. Cl.

| | |
|---|---|
| ***B60W 30/18*** | (2012.01) |
| ***B60W 50/00*** | (2006.01) |
| ***B60W 50/14*** | (2020.01) |
| ***B60W 60/00*** | (2020.01) |
| ***H04W 4/40*** | (2018.01) |

(56) References Cited

U.S. PATENT DOCUMENTS

| | | | | |
|---|---|---|---|---|
| 2021/0261152 | A1 | 8/2021 | Meijburg et al. | |
| 2021/0390349 | A1 | 12/2021 | Hotson et al. | |
| 2021/0397827 | A1 | 12/2021 | Silver et al. | |
| 2022/0410894 | A1* | 12/2022 | Foster | G06V 20/588 |
| 2023/0222905 | A1* | 7/2023 | Xu | G08G 1/0112<br>340/913 |
| 2024/0005787 | A1* | 1/2024 | Austin | G08G 1/164 |
| 2024/0020988 | A1 | 1/2024 | Lyu et al. | |
| 2024/0346926 | A1* | 10/2024 | Mindt | G08G 1/096725 |

* cited by examiner

SYSTEMS AND METHODS FOR PERFORMING MITIGATION ACTIONS IN A TRAFFIC LIGHT OUTAGE EVENT

FIELD

The present disclosure relates to systems and methods for performing mitigation actions when a traffic light at a road intersection point is operating in a suboptimal manner.

BACKGROUND

Traffic signals or lights at road intersection points are important for maintaining smooth traffic flow. Traffic lights provide immense convenience to commuters when the traffic lights are operating optimally. However, the commuters may face inconvenience when a traffic light at an intersection point starts to operate in a suboptimal manner. Such an instance may result in traffic jams or may even result in adverse situations.

It may take a few minutes or hours (or even a day in some instances) to get the suboptimal traffic light fixed, after the suboptimal condition of the traffic light is reported to the authorities. During this time duration, it is important that the traffic is managed in an optimal manner at the intersection point to reduce inconvenience for the commuters.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
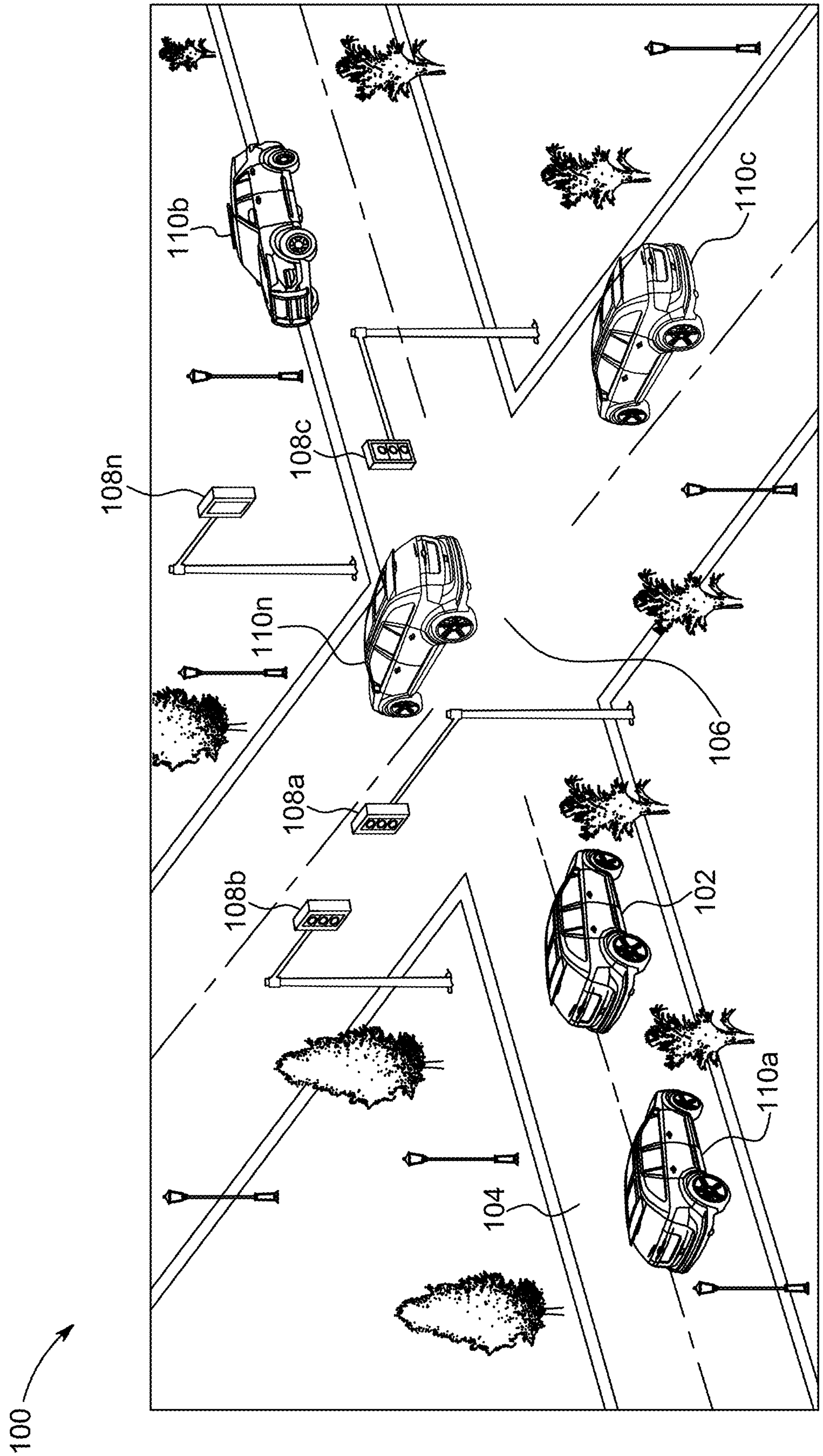
FIG. 1 depicts an environment in which techniques and structures for providing the systems and methods disclosed herein may be implemented.

The present disclosure describes a vehicle that may perform one or more remedial or mitigation actions when a traffic light may be malfunctioning or not operating in an optimal manner. The vehicle may first predict that the vehicle may be approaching an intersection point on a road on which the vehicle may be traveling. The vehicle may predict that the vehicle may be approaching the intersection point based on a real-time vehicle geolocation, map information associated with the road, historical vehicle travel pattern, inputs (e.g., images) obtained from a vehicle sensor unit (e.g., vehicle cameras), and/or the like. Responsive to predicting that the vehicle may be approaching the intersection point, the vehicle may determine whether the intersection point includes a traffic signal/light, based on the inputs obtained from the sensor unit.

Responsive to determining that the intersection point includes a traffic light, the vehicle may determine whether the traffic light is operating optimally or is in a suboptimal condition based on the inputs obtained from the sensor unit. In some aspects, the vehicle may determine that the traffic light may be malfunctioning when the traffic light may be switched off or flickering in a non-standard pattern. In further aspects, the vehicle may determine that the traffic light may be malfunctioning when a turbulent or non-standard traffic flow may be present at the intersection point. Responsive to determining that the traffic light may be malfunctioning, the vehicle may perform one or more mitigation/remedial actions, as described below.

For example, the vehicle may output a notification on a user device or a vehicle Human-Machine Interface (HMI), informing the vehicle user about the malfunctioning traffic light and a recommended manner (e.g., best practice) to conveniently navigate an intersection point in an event of a malfunctioning traffic light. The vehicle may further transmit the notification to other vehicles that may be located in proximity to the intersection point, via vehicle-to-vehicle (V2V) communication or vehicle-to-infrastructure (V2I) communication.

In further aspects, the vehicle may store location information associated with the malfunctioning traffic light in a vehicle memory, so that appropriate alert may be provided to the vehicle user when the vehicle again travels through the intersection point in the future. The vehicle may further autonomously reduce vehicle speed, turn ON vehicle headlights, maneuver vehicle movement, and/or the like, to enable the vehicle to conveniently navigate the traffic at the intersection point.

The present disclosure discloses a vehicle that performs one or more mitigation actions when a traffic light at a road intersection point is malfunctioning. The vehicle may output a notification for the vehicle user and other vehicles in proximity to the intersection point, so that the vehicles may conveniently cross the intersection point in the event of a traffic light outage.

The vehicle further autonomously reduces the vehicle speed and/or turns ON the vehicle headlights, to facilitate the vehicle in conveniently crossing the intersection point. Furthermore, the vehicle stores location information associated with the malfunctioning traffic light in the vehicle memory, so that the vehicle user may be appropriately alerted again when the vehicle approaches the same intersection point in the future.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 that may be traveling on a road network 104. The vehicle 102 may take the form of any passenger or commercial vehicle such as a car, a work vehicle, a crossover vehicle, a truck, a van, a minivan, a taxi, a bus, etc. The vehicle 102 may be a manually driven vehicle or may be configured to operate in a partially/fully autonomous mode. Further, the vehicle 102 may include any powertrain such as a gasoline engine, one or more electrically-actuated motor(s), a hybrid system, etc.

In some aspects, the road network 104 may include an intersection point 106 and one or more traffic signals or lights 108*a*, 108*b*, 108*c*, 108*n* (collectively referred to as traffic lights 108) disposed at or in proximity to the intersection point 106. The intersection point 106, as described in the present disclosure, may mean a point on the road network 104 through which one or more vehicles may travel in three or more directions. For example, the vehicle 102 may travel in a forward direction, take a left turn, take a right turn or take a U-turn at the intersection point 106, thereby enabling the vehicle 102 to travel in four different directions. In an exemplary aspect, the traffic lights 108 may face in each direction (e.g., one or more traffic lights may face towards each road leading towards the intersection point 106), to enable smooth flow of traffic through the intersection point 106.

A person ordinarily skilled in the art may appreciate that when all the traffic lights 108 are operating optimally, commuters may conveniently cross the intersection point 106. However, when one or more traffic lights 108 may be malfunctioning or operating in a suboptimal manner, the commuters may face confusion and inconvenience, leading to traffic jams and chaotic/turbulent traffic flow at the intersection point 106.

In some aspects, the vehicle 102 may be configured to determine when one or more traffic lights (e.g., the traffic light 108*a*) may be malfunctioning or operating in a suboptimal manner, and perform remedial actions responsive to such determination. The vehicle 102 may be specifically configured to determine sudden changes in driving routes/patterns/behavior or sudden traffic light outages in proximity to the intersection point 106, and accordingly perform remedial actions to enable the vehicle 102 to efficiently cross the intersection point 106. In an exemplary aspect, a "sudden" traffic light outage, as described in the present disclosure, may mean an instance where the malfunction of the traffic light 108*a* is not yet reported to the authorities, and hence the process of fixing the malfunctioning traffic light 108*a* may not have begun. In further aspects, the sudden traffic light outage may mean an instance where the malfunctioning of the traffic light 108*a* is reported to the authorities, but a notification or an alert regarding the malfunctioning traffic light 108*a* has not yet reached the driver/user (not shown) associated with the vehicle 102. In yet another aspect, the sudden traffic light outage may mean an instance where the malfunctioning of the traffic light 108*a* is reported to the authorities and a notification or an alert regarding the malfunctioning traffic light 108*a* has reached the vehicle user, but the user has missed or forgotten about the alert. An example process followed by the vehicle 102 to assist the user in such instances is briefly described below, and described in detail later in conjunction with FIG. 2.

When the vehicle 102 may be traveling on the road network 104, the vehicle 102 may be configured to predict that the vehicle 102 may be approaching the intersection point 106. In one exemplary aspect, the vehicle 102 may predict that the vehicle 102 may be approaching the intersection point 106 based on a real-time vehicle geolocation and a map information associated with the road network 104 that may be pre-stored in a vehicle memory (shown as memory 244 in FIG. 2). In another exemplary aspect, the vehicle 102 may predict that the vehicle 102 may be approaching the intersection point 106 based on historical travel pattern associated with the vehicle 102. In yet another aspect, the vehicle 102 may predict that the vehicle 102 may be approaching the intersection point 106 based on inputs (e.g., images) captured by a vehicle sensor unit (e.g., vehicle cameras, shown as vehicle sensory system 232 in FIG. 2).

Responsive to determining that the vehicle 102 may be approaching the intersection point 106, the vehicle 102 may determine whether the intersection point 106 has any traffic light (e.g., facing the direction of the vehicle 102 travel towards the intersection point 106), no traffic light but a stop sign, or no traffic light and no stop sign, based on the inputs obtained from the sensor unit. Responsive to determining that the intersection point 106 does not any traffic light, in some aspects, the vehicle 102 may output a notification on a user device (shown as user device 202 in FIG. 2) and/or a vehicle Human-Machine Interface (HMI, shown as infotainment system 238 in FIG. 2), indicating to the vehicle 102 user that the vehicle 102 should be driven cautiously at the intersection point 106 since it does not have any traffic light/signal.

On the other hand, responsive to determining that the intersection point 106 includes one or more traffic lights (e.g., the traffic lights 108*a*, 108*b*), the vehicle 102 may determine whether the traffic light(s) are operating optimally or are malfunctioning/operating in a suboptimal manner, based on the inputs obtained from the sensor unit. In some aspects, when the vehicle 102 determines that the traffic light (e.g., the traffic light 108*a*) is displaying red, yellow or green light (based on the inputs obtained from the sensor unit) and/or other vehicles in proximity to the intersection point 106 are stopping, the vehicle 102 may determine that the traffic light 108*a* is operating optimally.

On the other hand, the vehicle 102 may determine that the traffic light 108*a* may be in a suboptimal condition when the traffic light 108*a* may be switched OFF or flickering, or there may be presence of a turbulent or non-standard traffic flow pattern in proximity to the intersection point 106 (determined based on the inputs obtained from the sensor unit). Responsive to determining that the traffic light 108*a* may be in a suboptimal condition, the vehicle 102 may perform one or more remedial actions to enable the vehicle 102 to conveniently cross the intersection point 106. Examples of the remedial actions are described below, which should not be construed as limiting.

In some aspects, responsive to determining that the traffic light 108*a* may be in a suboptimal condition, the vehicle 102 may output a notification on the user device and/or the vehicle HMI, informing the vehicle user about the malfunctioning traffic light 108*a*, and also recommending best practices of navigating the intersection point 106 in an event of a malfunctioning traffic light. The vehicle 102 may further transmit a message/alert notification to additional vehicles 110*a*, 110*b*, 110*c*, 110*n* (collectively referred to as the additional vehicles 110) that may be traveling on the road network 104, informing the additional vehicles 110 about the malfunctioning traffic light 108*a*. In this manner, the vehicle 102 may make other vehicles aware of the malfunctioning traffic lights at the intersection point 106, so that the vehicles may take appropriate remedial actions. In some aspects, the vehicle 102 may transmit the message to the additional vehicles 110 via vehicle-to-vehicle (V2V) communication or vehicle-to-infrastructure (V2I) communication.

In further aspects, responsive to determining that the traffic light 108*a* is in a suboptimal condition, the vehicle 102 may autonomously reduce the vehicle 102 speed and/or turn ON vehicle 102 headlights, to enable the vehicle 102 to conveniently cross the intersection point 106. The vehicle 102 may further store location information associated with the malfunctioning traffic light 108*a* in the vehicle memory, so that the vehicle user may be alerted again about the potentially malfunctioning traffic light 108*a* at the intersection point 106, when the vehicle 102 again travels through the intersection point 106 in the future.

Further vehicle 102 details are described below in conjunction with FIG. 2.

The vehicle 102 implements and/or performs operations, as described here in the present disclosure, in accordance with the owner manual and safety guidelines. In addition, any action taken by the vehicle operator/user based on the notifications/recommendations provided by the vehicle 102 should comply with all the rules specific to the location and operation of the vehicle 102 (e.g., Federal, state, country, city, etc.). The notifications/recommendations, as provided by the vehicle 102, should be treated as suggestions and only followed according to any rules specific to the location and operation of the vehicle 102.

Figure 2:
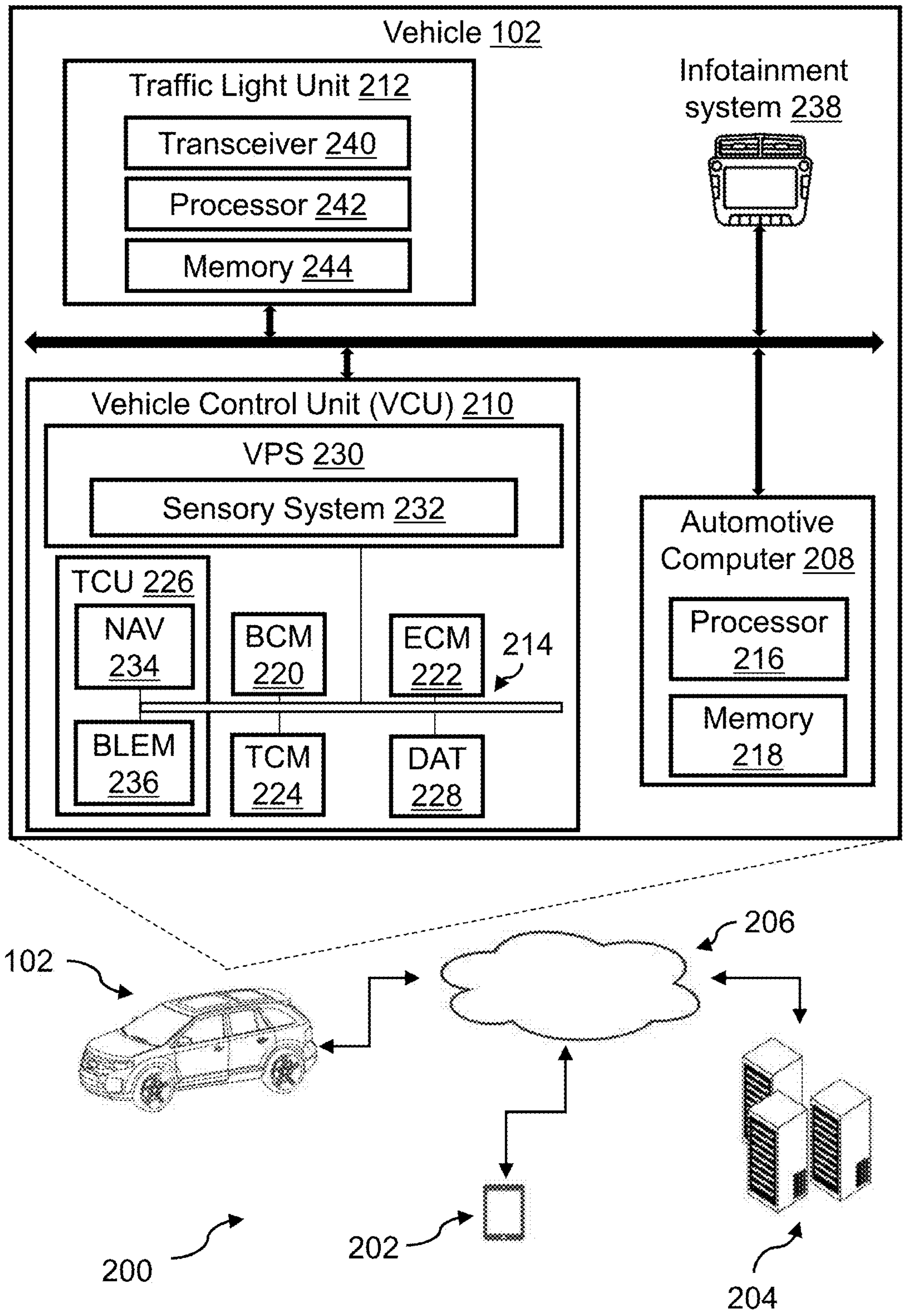
FIG. 2 depicts a block diagram of a system to perform remedial actions when a traffic light at a road intersection point is in a suboptimal condition, in accordance with the present disclosure.

FIG. 2 depicts a block diagram of a system 200 to perform remedial actions when a traffic light at a road intersection point is in a suboptimal condition, in accordance with the present disclosure. While describing FIG. 2, references will be made to FIG. 3.

The system 200 may include the vehicle 102, a user device 202 and one or more servers 204 (or a server 204) communicatively coupled with each other via one or more networks 206. In some aspects, the user device 202 may be associated with a user/operator of the vehicle 102, and may be, for example, a mobile phone, a laptop, a tablet, a smartwatch, or any other device having communication capability. The server 204 may be part of a cloud-based computing infrastructure and may be associated with and/or include a Telematics Service Delivery Network (SDN) that provides digital data services to the vehicle 102 and other vehicles (not shown in FIG. 2) that may be part of a vehicle fleet.

In further aspects, the server 204 may store map information associated with the road network 104, which may include, for example, location information of one or more intersection points (e.g., the intersection point 106) on the road network 104. The server 204 may further store information associated with historical vehicle travel pattern of the vehicle 102. The historical vehicle travel pattern may include, for example, information associated with typical routes taken by the vehicle 102 on the road network 104 in daily commute, locations of intersection points typically crossed by the vehicle 102 on each day (e.g., at different times of the day), and/or the like.

The server 204 may transmit the map information and/or the information associated with historical vehicle travel pattern to the vehicle 102 at a predefined frequency, or when the vehicle 102 transmits a request to the server 204 to obtain such information.

The network(s) 206 illustrates an example communication infrastructure in which the connected devices discussed in various embodiments of this disclosure may communicate. The network(s) 206 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 208, a Vehicle Control Unit (VCU) 210, and a traffic light unit 212 (or unit 212). The VCU 210 may include a plurality of Electronic Control Units (ECUs) 214 in communication with the automotive computer 208.

In some aspects, the automotive computer 208 and/or the unit 212 may be installed anywhere in the vehicle 102, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be in communication with one or more memory devices in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable medium or memory storing a traffic light assessment program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle 102 systems, connected servers (e.g., the server(s) 204), and other vehicles (not shown in FIG. 2) operating as part of a vehicle fleet. The VCU 210 may include or communicate with any combination of the ECUs 214, such as a Body Control Module (BCM) 220, an Engine Control Module (ECM) 222, a Transmission Control Module (TCM) 224, a Telematics Control Unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 may include one or more vehicle sensors including, but not limited to, a radio detection and ranging (radar) sensor configured for detection and localization of objects inside and outside the vehicle 102 using radio waves, sitting area buckle sensors, sitting area sensors, a light detecting and ranging (lidar) sensor, door sensors, proximity sensors, temperature sensors, wheel sensors, ambient weather sensors, vehicle internal and external cameras, one or more rain sensors, capacitive moisture sensors, a tire pressure sensor, ultrasonic sensors, etc. In some aspects, the vehicle sensory system(s) 232 and the TCU 226 may collectively be considered as a vehicle "sensor unit" that transmits inputs (e.g., images, real-time vehicle geolocation, etc.) to the unit 212. The sensor unit may be configured to capture inputs (e.g., images) associated with vehicle surroundings via, e.g., the vehicle cameras, radar sensors, lidar sensors, etc.

In some aspects, the VCU 210 may control vehicle operational aspects and implement one or more instruction sets received from the user device 202, from one or more instruction sets stored in the memory 218, including instructions operational as part of the unit 212.

The TCU 226 may be configured and/or programmed to provide vehicle connectivity to wireless computing systems onboard and off board the vehicle 102 and may include a Navigation (NAV) receiver 234 for receiving and processing a GPS signal, a BLE Module (BLEM) 236, a Wi-Fi transceiver, a UWB transceiver, and/or other wireless transceivers (not shown in FIG. 2) that may be configurable for wireless communication (including cellular communication) between the vehicle 102 and other systems (e.g., the user device 202, a key fob, an NFC device, etc.), computers, and modules. The NAV receiver 234 may be configured to determine the real-time vehicle geolocation. The TCU 226 may be in communication with the ECUs 214 by way of a bus.

The ECUs 214 may control aspects of vehicle operation and communication using inputs from human drivers, inputs from an autonomous vehicle controller, the unit 212, and/or via wireless signal inputs received via the wireless connection(s) from other connected devices, such as the user device 202, the server(s) 204, among others.

The BCM 220 generally includes integration of sensors, vehicle performance indicators, and variable reactors associated with vehicle systems and may include processor-based power distribution circuitry that can control functions associated with the vehicle body such as lights, windows, security, camera(s), fan, headlights, audio system(s), speakers, wipers, door locks and access control, mirrors, various comfort controls, enclosures, and/or the like. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and adaptive cruise control, among other features. The DAT controller 228 may also provide aspects of user and environmental inputs usable for user authentication.

In some aspects, the automotive computer 208 may connect with an infotainment system 238 (or a vehicle Human-Machine Interface (HMI) 238). The infotainment system 238 may include a touchscreen interface portion and may include voice recognition features, biometric identification capabilities that can identify users based on facial recognition, voice recognition, fingerprint identification, or other biological identification means. In other aspects, the infotainment system 238 may be further configured to receive user instructions/inputs via the touchscreen interface portion and/or display notifications/recommendations, navigation maps, etc. on the touchscreen interface portion.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 102, may include a transceiver 240, a processor 242, and a computer-readable memory 244.

The transceiver 240 may be configured to receive information/inputs from one or more external devices or systems, e.g., the user device 202, the server(s) 204, and/or the like via the network 206. For example, the transceiver 240 may receive the map information and/or the information associated with historical vehicle travel pattern described above from the server 204 via the network 206. Further, the transceiver 240 may transmit notifications (e.g., alert/alarm signals) to the external devices or systems. In addition, the transceiver 240 may be configured to receive information/inputs from vehicle 102 components such as the infotainment system 238, the vehicle sensory system 232, the TCU 226, and/or the like. Further, the transceiver 240 may transmit notifications (e.g., alert/alarm/command signals) to the vehicle 102 components such as the infotainment system 238, the BCM 220, etc.

The processor 242 and the memory 244 may be the same as or similar to the processor 216 and the memory 218, respectively. In some aspects, the processor 242 may utilize the memory 244 to store programs in code and/or to store data for performing aspects in accordance with the disclosure. The memory 244 may be a non-transitory computer-readable medium or memory storing the traffic light assessment program code. In some aspects, the memory 244 may be configured to store the map information and/or the information associated with historical vehicle travel pattern that the vehicle 102 obtains from the server 204.

In operation, when the vehicle 102 may be traveling on the road network 104, the processor 242 may obtain inputs from the vehicle sensory system 232 and/or the TCU 226. The processor 242 may further fetch the map information and/or the information associated with historical vehicle travel pattern from the memory 244. Based on the obtained information, the processor 242 may predict that the vehicle 102 may be approaching the intersection point 106. For example, the processor 242 may correlate the real-time vehicle geolocation obtained from the TCU 226 with the map information (which may include location information associated with the intersection point 106) fetched from the memory 244, and predict/determine that the vehicle 102 may be approaching the intersection point 106 based on the correlation.

In further aspects, the processor 242 may predict that the vehicle 102 may be approaching the intersection point 106 based on the information associated with historical vehicle travel pattern. For example, if the historical vehicle travel pattern indicates that the vehicle 102 typically crosses the intersection point 106 every Monday at 8 AM, the processor 242 may predict that the vehicle 102 may be approaching the intersection point 106 when the vehicle 102 may be traveling on the road network 104 on Monday at 8 AM.

In additional aspects, the processor 242 may predict/determine that the vehicle 102 may be approaching the intersection point 106 based on the inputs (e.g., images captured by vehicle's exterior cameras) obtained from the vehicle sensory system 232. In this case, the memory 244 may pre-store a plurality of intersection point images, and the processor 242 may predict/determine that the vehicle 102 may be approaching the intersection point 106 by correlating/comparing the stored images with the images captured by the vehicle's exterior cameras.

Responsive to predicting/determining that the vehicle 102 may be approaching the intersection point 106, the processor 242 may activate a "traffic light assessment mode" of the vehicle 102. When the traffic light assessment mode is activated, the processor 242 may commence to analyze the inputs obtained from the vehicle sensory system 232, and determine whether the intersection point 106 includes one or more traffic lights, has no traffic light but a stop sign, or no traffic light and no stop sign, based on the input analysis. For example, the processor 242 may analyze the images captured by the vehicle's exterior cameras, and determine whether the intersection point 106 includes one or more traffic lights, has no traffic light but a stop sign, or no traffic light and no stop sign, based on the image analysis. As described above in conjunction with FIG. 1, the processor 242 may cause the user device 202 and/or the infotainment system 238 to output a preset notification indicating to the vehicle user that the vehicle 102 should be driven cautiously at the intersection point 106 since it does not have any traffic light (and/or stop sign), responsive to determining that the intersection point 106 has no traffic light. In alternative aspects, the processor 242 may not output any notification responsive to determining that the intersection point 106 has no traffic light.

On the other hand, responsive to determining that the intersection point includes one or more traffic lights (e.g., the traffic lights 108*a-n*), the processor 242 may analyze the inputs obtained from the vehicle sensory system 232 and determine whether the traffic lights (e.g., the traffic light 108*a*) is operating optimally or in a suboptimal manner based on the input analysis. In some aspects, when the processor 242 determines that the traffic light 108*a* is displaying red, yellow or green light (based on the analysis of inputs obtained from the vehicle sensory system 232) and/or other vehicles (e.g., the vehicles 110) in proximity to the intersection point 106 are stopping, the processor 242 may determine that the traffic light 108*a* is operating optimally.

On the other hand, the processor 242 may determine that the traffic light 108*a* is in a suboptimal condition or malfunctioning when the processor 242 determines that the traffic light 108*a* is switched off (i.e., no light is being illuminated) or flickering in a non-standard pattern based on the inputs obtained from the vehicle sensory system 232. Examples of flickering in a non-standard pattern include, but are not limited to, illumination of two or three lights simultaneously, frequent switching ON and OFF of one or more lights, and/or the like.

As another example, the processor 242 may determine that the traffic light 108*a* is in a suboptimal condition or malfunctioning when the processor 242 determines a presence of turbulent or non-standard traffic flow pattern in proximity to the intersection point 106 based on the inputs obtained from the vehicle sensory system 232. Examples of turbulent or non-standard traffic flow pattern include, but are not limited to, vehicles from opposite directions trying to cross the intersection point 106 at the same time, vehicles from different directions traveling towards the intersection point 106 at the same time, vehicles stopping abruptly at the intersection point 106, vehicles taking left/right turn when incoming vehicles from these directions may still be moving, and/or the like.

As yet another example, the processor 242 may determine that the traffic light 108*a* is in a suboptimal condition or malfunctioning when another traffic light (e.g., the traffic light 108*b*) in the same direction as the traffic light 108*a* is displaying a different light than the traffic light 108*a*. In this case, the processor 242 may first determine a presence of a secondary traffic light (e.g., the traffic light 108*b*) at the intersection point 106 and on a vehicle route towards the intersection point 106 based on the inputs obtained from the vehicle sensory system 232. In some aspects, the secondary traffic light (e.g., the traffic light 108*b*) may be disposed/located in proximity to the traffic light 108*a* and facing the same side of the vehicle route as the traffic light 108*a* (i.e., the light is facing the same direction as the incoming vehicle 102), as shown in FIG. 1. Responsive to determining the presence of such a secondary traffic light (e.g., the traffic light 108*b*), the processor 242 may compare a first light pattern being displayed on the traffic light 108*a* with a second light pattern being displayed on the traffic light 108*b* based on the inputs obtained from the vehicle sensory system 232. The processor 242 may determine that the traffic lights 108*a* and/or 108*b* may be in a suboptimal condition or malfunctioning when the first light pattern may be different from the second light pattern. For example, the processor 242 may determine that the traffic lights 108*a* and/or 108*b* may be in a suboptimal condition or malfunctioning when the traffic light 108*a* may be displaying green light and simultaneously the traffic light 108*b* may be displaying red light (or vice-versa).

Figure 3:
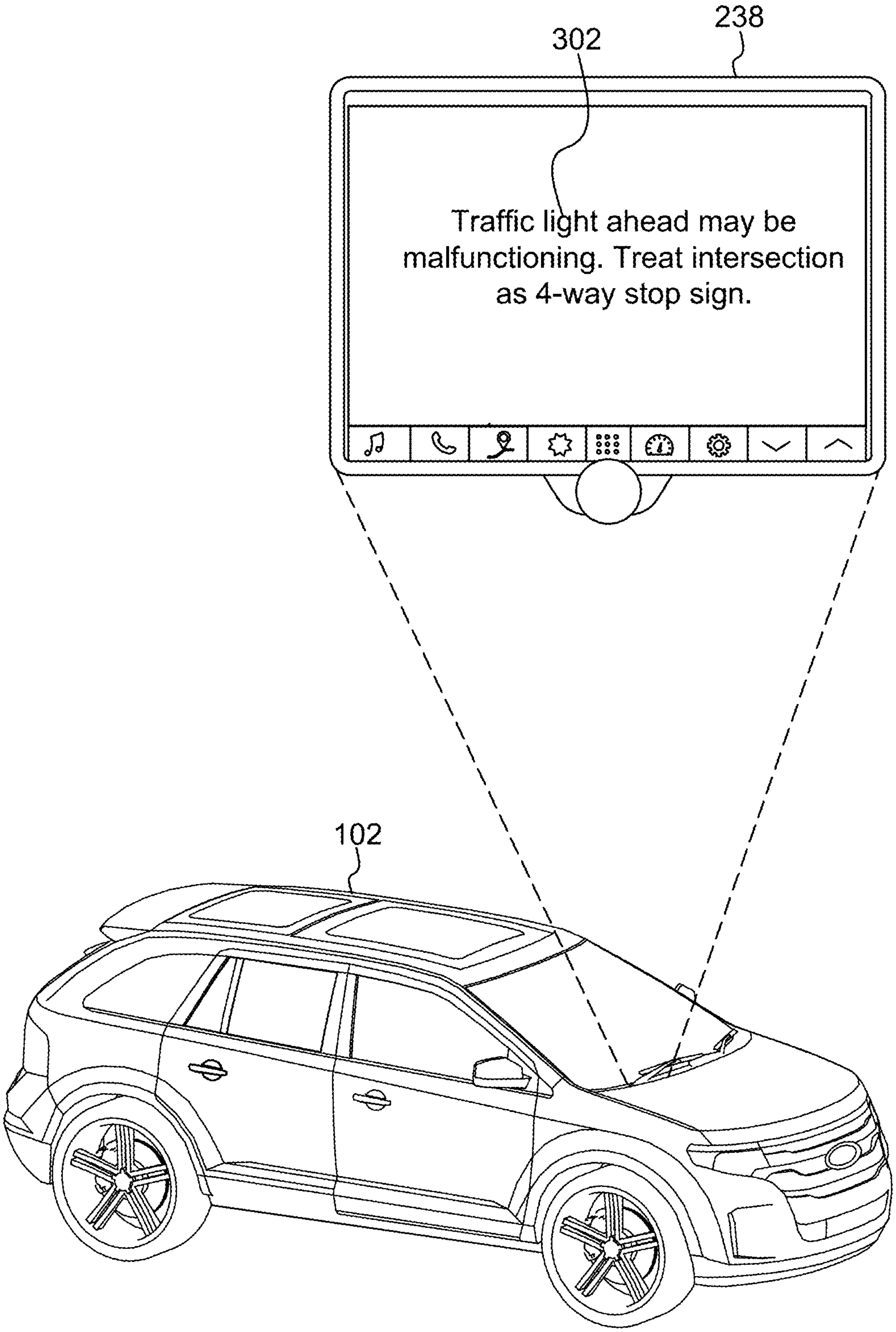
FIG. 3 depicts an example notification displayed on a vehicle Human-Machine Interface (HMI) in accordance with the present disclosure.

Responsive to determining that the traffic light 108*a* (and/or the traffic light 108*b*) may be in a suboptimal condition or malfunctioning by using one or more methods described above, the processor 242 may perform one or more remedial/mitigation actions to facilitate the vehicle 102 (and the vehicle user) to conveniently cross the intersection point 106. For example, responsive to determining that the traffic light 108*a* is in a suboptimal condition or malfunctioning, the processor 242 may output a notification on the user device 202 and/or the infotainment system 238, indicating to the vehicle user that the traffic light 108*a* may be malfunctioning and hence the vehicle user should exercise caution while crossing the intersection point 106. In some aspects, the notification may include information associated with the malfunctioning traffic light 108*a* (e.g., its location) and/or information associated with a recommended manner (e.g., best practice, which may be pre-stored in the memory 244) to navigate the intersection point 106 in an event of a suboptimal traffic light (or a traffic light outage). An example notification 302 being displayed on the infotainment system 238 is depicted in FIG. 3. As shown in FIG. 3, the notification 302 may state, "Traffic light ahead may be malfunctioning. Treat intersection as 4-way stop sign." The vehicle user may hear/view the notification 302, and accordingly maneuver the vehicle movement to conveniently cross the intersection point 106.

In some aspects, in addition to outputting the notification 302 on the user device 202 and/or the infotainment system 238, the processor 242 may output or transmit, via the transceiver 240, another notification/alert signal to the vehicles 110 that may be traveling on the road network 104 in proximity to the intersection point 106. This notification may include a location information associated with the traffic light 108*a*, and a communication indicating that the traffic light 108*a* may be malfunctioning. In this manner, the processor 242 may facilitate the other vehicles 110 (and their operators) to be aware of the malfunctioning traffic light 108*a* in a timely manner, and accordingly take remedial actions.

In some aspects, the processor 242 may transmit/output the notification to the vehicles 110 via V2V communication. In other aspects, the processor 242 may transmit/output the notification to infrastructure via V2I communication, which may then transmit the notification to the vehicles 110.

In further aspects, responsive to determining that the traffic light 108*a* is in a suboptimal condition or malfunctioning, the processor 242 may autonomously reduce the vehicle 102 speed and/or turn ON a vehicle 102 headlight, so that the vehicle 102 may conveniently cross the intersection point 106. The processor 242 may further store location information associated with the malfunctioning traffic light 108*a* in the memory 244, so that the vehicle user may be alerted again about the potentially malfunctioning traffic light 108*a* at the intersection point 106, when the vehicle 102 again travels through the intersection point 106 in the future.

In additional aspects, responsive to determining that the traffic light 108*a* is in a suboptimal condition or malfunctioning, the processor 242 may facilitate the vehicle 102 to conveniently navigate the traffic at the intersection point 106. In this case, the processor 242 may first determine a movement pattern associated with the vehicles 110 located at the intersection point 106, based on the inputs obtained from the vehicle sensory system 232. The movement pattern may include, e.g., vehicle speed, rate of change of speed, direction of motion, traffic flow, etc., associated with the vehicles 110. The processor 242 may then autonomously control the vehicle 102 movement at the intersection point 106 based on the determined movement pattern, so that the vehicle 102 may conveniently cross the intersection point 106. For example, the processor 242 may autonomously control the speed, the direction of movement, the rate of change of speed, etc. associated with the vehicle 102 based on the determined movement pattern, so that the vehicle 102 may conveniently navigate the traffic at the intersection point 106. The processor 242 may also output an alert notification on the user device 202 and/or the infotainment system 238 when one or more vehicles may be getting too close to the vehicle 102, when the vehicle 102 may attempting to cross the intersection point 106.

Figure 4:
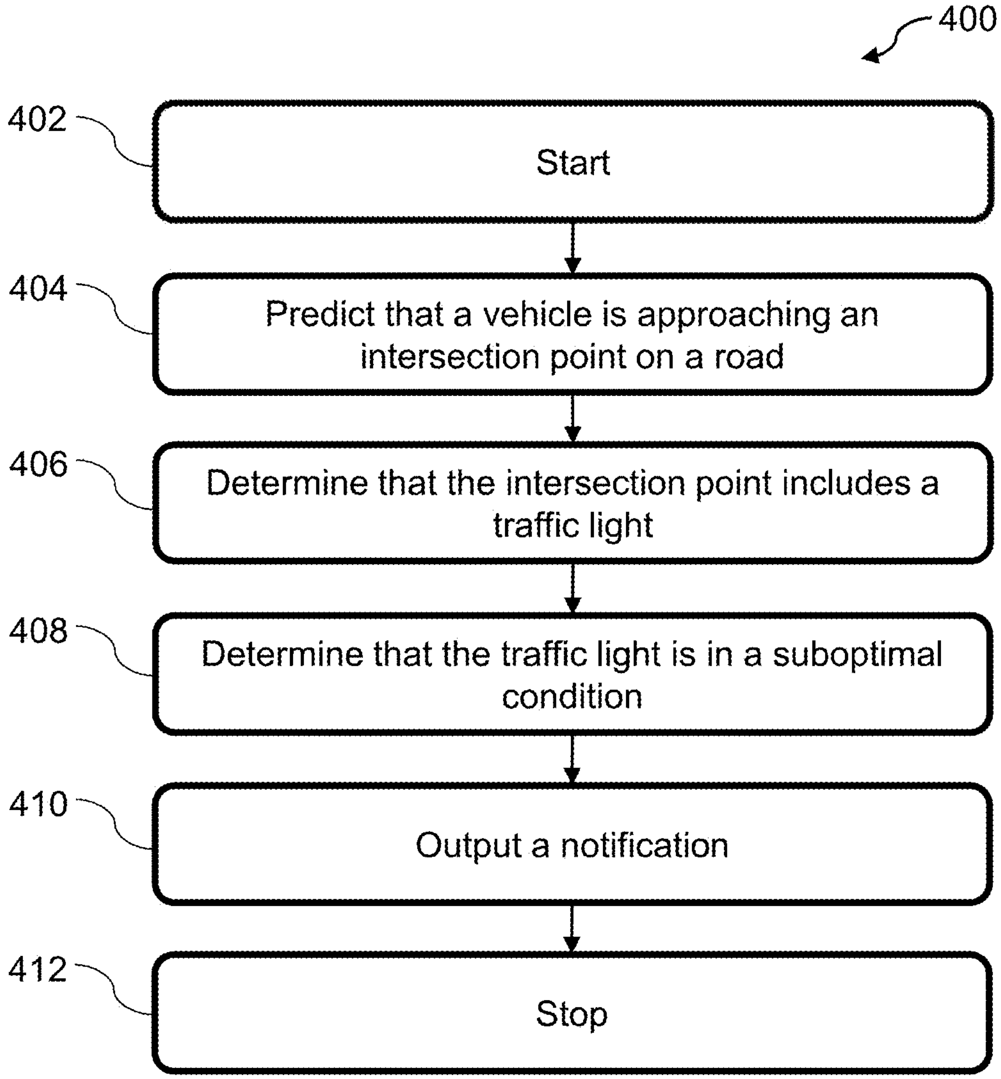
FIG. 4 depicts a flow diagram of an example method to perform remedial actions when a traffic light at a road intersection point is in a suboptimal condition, in accordance with the present disclosure.

FIG. 4 depicts a flow diagram of an example method 400 to perform remedial actions when a traffic light at a road intersection point is in a suboptimal condition, in accordance with the present disclosure. FIG. 4 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include predicting, by the processor 242, that the vehicle 102 is approaching the intersection point 106. At step 406, the method 400 may include determining, by the processor 242, that the intersection point 106 includes the traffic light 108*a* based on the inputs obtained from the vehicle sensory system 232, responsive to predicting that the vehicle 102 is approaching the intersection point 106.

At step 408, the method 400 may include determining, by the processor 242, that the traffic light 108*a* is in a suboptimal condition or malfunctioning based on the inputs obtained from the vehicle sensory system 232, responsive to determining that the intersection point 106 includes the traffic light 108*a*. At step 410, the method 400 may include outputting, by the processor 242, a notification responsive to determining that the traffic light 108*a* is in the suboptimal condition, as described above in conjunction with FIG. 2.

At step 412, the method 400 may end.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a sensor unit configured to capture inputs associated with vehicle surroundings; and a processor configured to:

predict that the vehicle is approaching an intersection point on a road;

determine that the intersection point comprises a traffic light based on the inputs obtained from the sensor unit, responsive to predicting that the vehicle is approaching the intersection point;

determine that the traffic light is in a suboptimal condition based on the inputs obtained from the sensor unit, responsive to determining that the intersection point comprises the traffic light, wherein the suboptimal condition of the traffic light is not previously known to the processor prior to the vehicle approaching the intersection point; and output a notification responsive to determining that the traffic light is in the suboptimal condition.

2. The vehicle of claim 1, wherein the processor is further configured to:

obtain at least one of a real-time vehicle geolocation, a map information associated with the road, or a historical vehicle travel pattern; and predict that the vehicle is approaching the intersection point based on at least one of the real-time vehicle geolocation, the map information associated with the road, or the historical vehicle traveling pattern.

3. The vehicle of claim 1, wherein the processor predicts that the vehicle is approaching the intersection point based on the inputs obtained from the sensor unit.

4. The vehicle of claim 1, wherein the processor is further configured to:

determine that the traffic light is switched off or flickering in a non-standard pattern based on the inputs obtained from the sensor unit; and determine that the traffic light is in the suboptimal condition responsive to determining that the traffic light is switched off or flickering in the non-standard pattern.

5. The vehicle of claim 1, wherein the processor is further configured to:

determine a presence of a turbulent traffic flow or a non-standard traffic flow pattern in proximity to the intersection point based on the inputs obtained from the sensor unit; and determine that the traffic light is in the suboptimal condition responsive to determining the presence of the turbulent traffic flow or the non-standard traffic flow pattern in proximity to the intersection point.

6. The vehicle of claim 1, wherein the processor is further configured to:

determine a presence of a secondary traffic light at the intersection point and on a vehicle route towards the intersection point based on the inputs obtained from the sensor unit, wherein the traffic light and the secondary traffic light are disposed in proximity to each other and on a same side of the vehicle route;

determine that a first light pattern displayed on the traffic light is different from a second light pattern displayed on the secondary traffic light based on the inputs obtained from the sensor unit, responsive to determining the presence of the secondary traffic light; and determine that the traffic light is in the suboptimal condition responsive to determining that the first light pattern is different from the second light pattern.

7. The vehicle of claim 1, wherein the processor outputs the notification on a user device or a vehicle Human-Machine Interface (HMI).

8. The vehicle of claim 1, wherein the processor outputs the notification to at least one of: one or more additional vehicles on the road via vehicle-to-vehicle (V2V) communication or to infrastructure via vehicle-to-infrastructure (V2I) communication, and wherein the notification comprises a traffic light geolocation.

9. The vehicle of claim 1, wherein the notification comprises an information associated with the suboptimal condition of the traffic light and an information associated with a recommended manner to navigate the intersection point in an event of a suboptimal traffic light.

10. The vehicle of claim 1, wherein the processor is further configured to autonomously reduce a vehicle speed or turn on a vehicle headlight responsive to determining that the traffic light is in the suboptimal condition.

11. The vehicle of claim 1 further comprising a memory, wherein the processor is further configured to store an information associated with a traffic light geolocation in the memory responsive to determining that the traffic light is in the suboptimal condition.

12. The vehicle of claim 1, wherein the processor is further configured to:

determine a movement pattern of one or more additional vehicles located at the intersection point based on the inputs obtained from the sensor unit, responsive to determining that the traffic light is in the suboptimal condition; and control a vehicle movement at the intersection point based on the movement pattern.

13. The vehicle of claim 1, wherein the sensor unit comprises at least one of a Global Positioning System (GPS) receiver, a vehicle camera, a Radio Detection And Ranging (radar) sensor, or a Light Detection and Ranging (lidar) sensor.

14. A method comprising:

predicting, by a processor, that a vehicle is approaching an intersection point on a road;

determining, by the processor, that the intersection point comprises a traffic light based on inputs obtained from a sensor unit responsive to predicting that the vehicle is approaching the intersection point, wherein the sensor unit is configured to capture the inputs associated with vehicle surroundings;

determining, by the processor, that the traffic light is in a suboptimal condition based on the inputs obtained from the sensor unit, responsive to determining that the intersection point comprises the traffic light, wherein the suboptimal condition of the traffic light is not previously known to the processor prior to the vehicle approaching the intersection point; and outputting, by the processor, a notification responsive to determining that the traffic light is in the suboptimal condition.

15. The method of claim 14 further comprising:

obtaining at least one of a real-time vehicle geolocation, a map information associated with the road, or a historical vehicle travel pattern; and predicting that the vehicle is approaching the intersection point based on at least one of the real-time vehicle geolocation, the map information associated with the road, or the historical vehicle traveling pattern.

16. The method of claim 14 further comprising:

determining that the traffic light is switched off or flickering in a non-standard pattern based on the inputs obtained from the sensor unit; and determining that the traffic light is in the suboptimal condition responsive to determining that the traffic light is switched off or flickering in the non-standard pattern.

17. The method of claim 14 further comprising:

determining a presence of a turbulent traffic flow or a non-standard traffic flow pattern in proximity to the intersection point based on the inputs obtained from the sensor unit; and determining that the traffic light is in the suboptimal condition responsive to determining the presence of the turbulent traffic flow or the non-standard traffic flow pattern in proximity to the intersection point.

18. The method of claim 14, wherein the notification comprises an information associated with the suboptimal condition of the traffic light and an information associated with a recommended manner to navigate the intersection point in an event of a suboptimal traffic light.

19. The method of claim 14 further comprising autonomously reducing a vehicle speed or turning on a vehicle headlight responsive to determining that the traffic light is in the suboptimal condition.

20. A non-transitory computer-readable storage medium having instructions stored thereupon which, when executed by a processor, cause the processor to:

predict that a vehicle is approaching an intersection point on a road;

determine that the intersection point comprises a traffic light based on inputs obtained from a sensor unit responsive to predicting that the vehicle is approaching the intersection point, wherein the sensor unit is configured to capture the inputs associated with vehicle surroundings;

determine that the traffic light is in a suboptimal condition based on the inputs obtained from the sensor unit, responsive to determining that the intersection point comprises the traffic light, wherein the suboptimal condition of the traffic light is not previously known to the processor prior to the vehicle approaching the intersection point; and output a notification responsive to determining that the traffic light is in the suboptimal condition.

* * * * *